United States Patent [19]

Hatayama et al.

[11] Patent Number: 5,591,351
[45] Date of Patent: *Jan. 7, 1997

[54] AUTOMOBILE PARTS AND ENGINE CANISTERS

[75] Inventors: Toshio Hatayama; Mie Sasaki; Takeshi Kojima; Kouichi Sakai, all of Sagamihara, Japan

[73] Assignee: Teijin Limited, Osaka, Japan

[*] Notice: The term of this patent shall not extend beyond the expiration date of Pat. No. 5,290,855.

[21] Appl. No.: 277,698

[22] Filed: Jul. 21, 1994

Related U.S. Application Data

[63] Continuation of Ser. No. 961,861, Oct. 15, 1992, abandoned.

[30] Foreign Application Priority Data

Oct. 24, 1991 [JP] Japan .................................. 3-303902
Oct. 28, 1991 [JP] Japan .................................. 3-307186

[51] Int. Cl.$^6$ .................................................. B01D 35/00
[52] U.S. Cl. ...................... 210/767; 210/500.1; 528/298; 180/313
[58] Field of Search .................... 210/DIG. 17, 435, 210/767, 500.1, 500.27; 528/298; 180/313

[56] References Cited

U.S. PATENT DOCUMENTS

| | | | |
|---|---|---|---|
| 2,425,250 | 8/1947 | Lamb | 96/108 |
| 3,775,375 | 11/1973 | Wolf | 528/298 |
| 3,884,204 | 5/1975 | Krautwurst et al. | 96/130 |
| 3,961,008 | 6/1976 | Kuratsuji et al. | 264/178 R |
| 3,963,844 | 6/1976 | Shimotsuma et al. | 428/36.9 |
| 4,055,534 | 10/1977 | Gerber | 524/153 |
| 4,580,542 | 4/1986 | Kawabata | 123/557 |
| 4,885,082 | 12/1989 | Cantoni | 210/90 |
| 4,992,166 | 2/1991 | Lowsky et al. | 210/DIG. 17 |
| 5,290,835 | 3/1994 | Hatayama et al. | 524/109 |

FOREIGN PATENT DOCUMENTS

| | | |
|---|---|---|
| 0506227 | 9/1992 | European Pat. Off. . |
| 2428126 | 12/1974 | Germany . |
| 190962 | 8/1991 | Japan . |

OTHER PUBLICATIONS

JP-A-57 119 143, Yamaha Hatsudoki K.K., "Crankcase for Engine", Jul. 24, 1982, (abstract).3.

*Primary Examiner*—Matthew O. Savage
*Attorney, Agent, or Firm*—Sherman and Shalloway

[57] ABSTRACT

Automobile parts comprising polybutylene naphthalenedicarboxylate, which are used at such portion(s) of an automobile that come to contact with a fuel, an oil, combustion gas, or the like are provided. Furthermore, engine canister comprising the same polymer as above is provided. These automobile parts or engine canisters exhibit excellent mechanical strength, heat resistance, dimensional precision, chemical resistance, acid resistance, alkali resistance, and impermeability to gasoline and gasohol.

5 Claims, No Drawings

AUTOMOBILE PARTS AND ENGINE CANISTERS

This application is a continuation, of application Ser. No. 07/961,861, filed Oct. 15, 1992 which is now abandoned.

FIELD OF THE INVENTION

This invention relates to an automobile part and an engine canister comprising polybutylene naphthalenedicarboxylate (hereinafter sometimes referred to as PBN).

BACKGROUND OF THE INVENTION

A large number of different materials are used in automobile parts, such as metals, glass, rubber and plastics. Of those, thermoplastic plastics contribute to reduce weight of automobiles, are subject to less restrictions in designing automobile parts, and allow high productivity of the parts made thereof and easy reduction in production costs. Because of these advantages, use of plastics for automobile production has been steadily increasing in recent years.

For the automobile parts for which the required properties are relatively mild, general-purpose plastics such as polyethylene and polypropylene have been used since relatively early times. With the increasing trend of the recent years to substitute with plastics even for the parts which are used under severe environmental conditions such as high temperature and high humidity of an engine room, more and more engineering plastics such as polyamide, polyacetal, polybutylene terephthalate (hereinafter abbreviated as PBT), etc., excelling in mechanical strength and heat resistance are used.

In particular, materials to be used for the parts that come into direct contact with fuel, various oils and/or combustion gas are required to have properties such as high resistance to chemicals, oil, gasoline, hot water, alkalis and acids, etc.

Each of known engineering plastics has both sides of advantageous characteristics and defective characteristics. For example, polyamide excels in mechanical properties, heat resistance, oil resistance, gasoline resistance and moldability, but due to its high water absorption, it exhibits appreciable dimensional change or drop in mechanical strength upon absorbing water. It is also insufficient in chemical resistance, as it tends to develop stress cracks in the presence of metal salts such as calcium chloride.

PBT excels in mechanical properties, heat resistance, resistance to thermal aging, electrical characteristics, chemical resistance and moldability. However, it exhibits poor resistance to hot water, due to which defect some parts made thereof are low in reliability and unfit for practical use.

Those characteristics of engineering plastics are attributable to primary structures of respective polymers and the properties of specific groups contained therein, such as amide groups or ester groups. Therefore, attempts to improve the defects by use of additives or polymer blends cannot offer fundamental solutions.

Substitution of a metal case with a polyamide case has been also advancing for a case of engine canister filled with activated carbon, which has a function to absorb vaporized gasoline generating from a gasoline tank or engine. As already stated, however, polyamide tends to form stress cracks in the presence of a metal salt, and besides, it shows high "gasohol" permeability. Therefore, improvements on these points are in demand.

Here the "gasohol" is a mixture of gasoline and methanol, which serves as a fuel for methanol engines.

SUMMARY OF THE INVENTION

A first object of the present invention, therefore, is to provide automobile parts comprising engineering plastics, which are fit to be used as the parts coming into contact with fuel, oil, combustion gas, etc., and exhibit excellent oil resistance, chemical resistance, dimensional precision, gasoline resistance, hot water resistance, alkali resistance and acid resistance.

A second object of the present invention is to provide a canister for engines comprising engineering plastics, which canister exhibits excellent dimensional precision, oil resistance, chemical resistance, gasoline impermeability, gasohol impermeability, alkali resistance and acid resistance.

The first and second objects of the present invention are achieved by using polybutylene naphthalenedicarboxylate as the engineering plastics.

That is, according to the present invention, first, there is provided an automobile part in which a portion thereof that comes into direct contact with at least one of the fuel, oil and combustion gas, comprises at least polybutylene naphthalenedicarboxylate.

Secondly, according to the present invention, there is provided an engine canister, which comprises polybutylene naphthalenedicarboxylate.

An automobile part following the first invention excels in mechanical strength, heat resistance, hot water resistance, dimensional precision, resistance to thermal aging, all resistance, gasoline resistance, alkali resistance and acid resistance, and therefore, is used at such portion(s) of an automobile that come into direct contact with fuel, oil, combustion gas, etc.

A canister for engines, which follows the second invention, excels in mechanical strength, oil resistance, chemical resistance, gasoline impermeability, gasohol impermeability, alkali resistance and acid resistance, and therefore is advantageously used as combined with an automobile engine.

DETAILED DESCRIPTION OF THE INVENTION

The present invention including the two specific inventions is described in detail, which will make still preferred embodiments and their advantages clear.

The Invention Relating to Automobile Parts

First, the automobile parts according to the first invention of the present invention are described in full details.

In the present invention, PBN denotes a polyester whose main acid component is naphthalenedicarboxylic acid, preferably naphthalene-2,6-dicarboxylic acid, and whose main glycol component is 1,4-butanediol, i.e., a polyester whose whole recurring units or most of recurring units, that is, normally at least 90 mol %, preferably at least 95 mol%, of the recurring units, are butylene naphthalenedicarboxylate of the following formula.

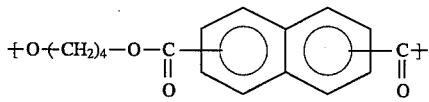

From the standpoint of maintaining the adequate level of strength and moldability of PBN, it preferably has an intrinsic viscosity [η] of 0.5 to 1.5 dl/g, in particular, 0.6 to 1.2 dl/g, as measured in o-chlorophenol as the solvent, at 35° C.

The PBN used in the present invention preferably has a tensile strength of 500 to 1400 kgf/cm$^2$, in particular 600 to 1,100 kgf/cm$^2$, as measured according to ASTM D-638.

The PBN can include dicarboxylic acid residue other than naphthalenedicarboxylic acid residue, glycol residue other than 1,4-butanediol residue and hydroxycarboxylic acid residue through copolymerization, within the ranges not impairing the physical property inherent in PBN. Examples of copolymerizable dicarboxylic acid include: aromatic dicarboxylic acids, such as phthalic, isophthalic, terephthalic, diphenyl-dicarboxylic, diphenylether-dicarboxylic, diphenoxyethane-dicarboxylic, diphenylmethane-dicarboxylic, diphenylketone-dicarboxylic, diphenylsulfide-dicarboxylic, and diphenylsulfone-dicarboxylic acids; aliphatic dicarboxylic acids such as succinic, adipic and sebacic acids; alicyclic dicarboxylic acids such as cyclohexane-dicarboxylic, tetralin-dicarboxylic and decalin-dicarboxylic acids, etc.

Examples of copolymerizable glycol include: ethylene glycol, propylene glycol, trimethylene glycol pentamethylene glycol, hexamethylene glycol, octamethylene glycol, neopentyl glycol, cyclohexane dimethanol, xylylene glycol, diethylene glycol, polyethylene glycol, bisphenol A, catechol, resorcinol hydroquinone, dihydroxydiphenyl, dihydroxydiphenylether, dihydroxydiphenylmethane, dihydroxydiphenylketone, dihydroxydiphenylsulfide, dihydroxydiphenylsulfone, etc.

Examples of copolymerizable hydroxycarboxylic acid include: hydroxybenzoic acid, hydroxynaphthoic acid, hydroxydiphenylcarboxylic acid and ω-hydroxycaproic acid, etc.

The PBN also can include a residue of tri- or more functional compound such as glycerin, trimethylolpropane, pentaerythritol, trimellitic acid, pyromellitic acid, etc, within the range that moldability of PBN is not substantially impaired.

Such PBN can be readily obtained through polycondensation of naphthalenedicarboxylic acid and/or its ester derivative with 1,4-butanediol glycol and/or its ester derivative, according to heretofore known production method of aromatic polyesters.

Various additives may be added to the PBN as the necessity arises, within the limit not appreciable impairing the physical properties of the PBN. Example of such additives include fillers of various forms such as fibrous, plate-like or granular form; stabilizers, coloring agents, ultraviolet absorbers, mold-releasing agents, antistatic agents, crystallization promoters, nucleating agents, impact strength improvers, fire retardants, fire retardant aids, etc.

For the occasion of formulating compositions of PBN and these additives, known facilities and methods generally employed for formulating conventional resin compositions can be used.

As the method of obtaining shaped or molded articles of automobile parts of the invention from PBN or a PBN composition, injection molding is the most preferred. Other known methods such as extrusion molding, compression molding, transfer molding or blow molding may also be employed. The shaped or molded articles obtained through these methods may further be processed secondarily, by such means as cutting, fusing, adhering, bonding, bending, vacuum plating, printing and coating, etc.

The automobile parts comprising PBN, provided by the present invention, excel in such properties as mechanical strength, dimensional precision, heat resistance, resistance to thermal aging, chemical resistance, gasoline resistance, hot water resistance and alkali resistance.

The automobile parts used at the portions coming into contact with fuel such as gasoline, diesel oil, light oil, kerosine, etc.; oils such as brake oil, torque converter oil, engine oil, etc.; or combustion gas, are subject to no critical limitations. Examples of the parts are an oil cap, an oil filter, a fuel cap, a fuel strainer, a tank, a cylinder head cover, cases of various kind, a distributor cap, a fuel ejector valve, an exhaust gas valve, etc.

The Invention Relating to an Engine Canister

Next the canister for engines of the present invention following the second invention is explained.

The engine canister of the present invention is a device having the function to absorb the vaporized gasoline occurring at gasoline tanks and engines after the engines are stopped, to prevent it from scattering in outside atmosphere. A canister comprises a case and an absorbing agent packed therein, typically, activated carbon.

As to the polybutylene naphthalenedicarboxylate (PBN) to be used and the additives which are optionally added thereto, the explanations thereabout offered for the invention relating to automobile parts are perfectly applicable as they are.

For shaping a case of the engine canister from PBN, injection molding method is the most preferred, while other molding methods such as blow molding may also be used.

The engine canister of the present invention excels in mechanical strength, oil resistance, chemical resistance, gasoline impermeability, gasohol impermeability, alkali resistance and-acid resistance. The engine canister is advantageously used as combined with an automobile engine.

EXAMPLES

The present invention is hereinafter explained more specifically, with reference to the following working examples. It should be clear that excellent automobile parts and canisters for engines can be obtained according to the present invention.

In the Examples, the methods used for measuring main physical properties are as follows. (In the following tests (4) to (8), an ASTM No. 1 test piece for tensile strength described in ASTM D-638 was used as a sample. Further, the test pieces used in tests (1 to (8)) were prepared by injection molding of each polymer.)

(1) Tensile strength:

Measured according to ASTM D-638.

(2) Dimensional precision:

A flat sample sheet of 60×100×1.5 mm is immersed in 23° C. water for 24 hours, and dimensional changes are measured.

(3) Deflection temperature of plastics under flexural load:

A test piece of 5"×½"×¼" is measured according to ASTM D-648.

(4) Resistance to thermal aging:

A sample is heat-treated at 180° C. for 1,000 hours and thereafter its tensile strength is measured.

(5) Gasoline resistance:

A sample is immersed in regular gasoline 60° C. for 50 days, and thereafter its tensile strength is measured.

(6) Hot water resistance:

A sample is treated in boiling water at 100° C. for 200 hours, and thereafter its tensile strength is measured.

(7) Acid- and alkali-resistance:

A sample is immersed in 10× hydrochloric acid or 10× aqueous NaOH solution, at 20° C. for seven days. Thereafter the appearance of the sample is evaluated with naked eyes.

(8) Chemical resistance:

A saturated aqueous solution of calcium chloride is applied on a sample, followed by a heat-treatment at 100° C. for 24 hours. Thereafter the appearance of the sample is observed.

(9) Gasoline permeability and gasohol permeability:

An extrusion-molded sample film of 300 μm in thickness is subjected to gas-permeability tests at 60° C., using vaporized gasoline and gasohol.

Example 1

The PBN used was composed substantially of butylene naphthalene-2,6-dicarboxylate unit and had a intrinsic viscosity [η] of 0.85 dl/g (measured in solvent: o-chlorophenol at 35° C.).

Injection molding conditions:
   Injection molding machine: IS75E, supplied Toshiba Machine Co., Ltd
   Temp.: 270° C.
   Injection pressure: 800 kg/cm$^2$
Molding conditions of the film:
   Extruder: VS-type extruder having 30 mmø, supplied by Thermoplastic Kogyo K.K.
   Die temp.: 270° C.

Comparative Example 1

Polybutylene terephthalate (PBT, [η]=1.02 dl/g) was injection molded under the conditions identical with those in Example 1, except that the injection temperature was changed to 250° C. The film molding conditions were identical with those in Example 1, except that the die temperature was 250° C.

Comparative Example 2

Nylon-66 (Leona® 140 2S, manufactured by Asahi Chemical Industry Co., Ltd., [η]=0.8 dl/g) was injection molded under the conditions identical with those in Example 1. The film-molding conditions were identical with those in Example 1.

The results of Example 1 and Comparative Examples 1 and 2 are shown in Table 1.

TABLE 1

| Test item | Unit | Example 1 PBN | Comparative Example 1 PBT | Comparative Example 2 Polyamide-66 |
|---|---|---|---|---|
| Tensile strength | kgf/cm$^2$ | 660 | 550 | 780 |
| Dimensional Precision (longitudinal direction) | % | less than 0.01 | less than 0.01 | 0.21 |
| Deflection temp. under flexural load | °C. | 76 | 58 | 75 |
| Thermal aging resistance (strength retention) | kgf/cm$^2$ (%) | 450 68 | Measurement impossible | 550 71 |
| Gasoline resistance (strength retention) | kgf/cm$^2$ (%) | 650 98 | 520 95 | 740 95 |
| Hot water resistance (strength retention) | kgf/cm$^2$ (%) | 650 98 | 150 27 | 710 91 |
| Acid resistance 10% hydrochloric acid | | No change | No change | Corroded |
| Alkali resistance 10% NaOH aq. solution | | No change | No change | No change |
| Chemical resistance CaCl$_2$ aq. | | No change | No change | Cracks observed |
| Gasoline permeability | g · cm/cm$^2$ · 24 hrs. | less than 0.001 | 0.038 | less than 0.001 |
| Gasohol permeability | g · cm/cm$^2$ · 24 hrs. | 0.25 | 2.2 | 21 |

What we claimed is:

1. An automobile part in which a portion thereof comes into direct contact with at least one of a fuel, an oil or a combustion gas, said portion consisting of polybutylene naphthalene-2,6-dicarboxylate, said polybutylene naphthalene-2,6-dicarboxylate being a homopolymer of butylene naphthalene-2,6-dicarboxylate, and having an intrinsic viscosity (η) of 0.6 to 1.2 dl/g, as measured in o-chlorophenol at 35° C., and a tensile strength of 600 to 1,100 kgf/cm$^2$.

2. An automobile oil filter having a filter portion that comes into direct contact with an oil, said filter portion consisting of polybutylene naphthalene-2,6-dicarboxylate which is a homopolymer consisting of butylene naphthalene-2,6-dicarboxylate or, said homopolymer and at least one additive in an amount that does not impair the physical properties of the polybutylene naphthalene-2,6-dicarboxylate, wherein said at least one additive is selected from the group consisting of filler, stabilizers, coloring agents, ultraviolet absorbers, mold-releasing agents, anti-static agents, crystallization promoters, nucleating agents, fire retardants and fire retardant aids.

3. An automobile part in which a portion thereof comes into direct contact with at least one of a fuel, an oil, or a combustion gas, said portion consisting of polybutylene naphthalene-2,6-dicarboxylate homopolymer and at least one additive in an amount that does not impair the physical properties of the polybutylene naphthalene-2,6-dicarboxylate, said polybutylene naphthalene-2,6-dicarboxylate having an intrinsic viscosity ($\eta$) of 0.6 to 1.2 dl/g, as measured in o-chlorophenol at 35° C., and a tensile strength of 600 to 1,100 kgf/c$^2$, wherein said at least one additive is selected from the group consisting of filler, stabilizers, coloring agents, ultraviolet absorbers, mold-releasing agents, anti-static agents, crystallization promoters, nucleating agents, fire retardants, and fire retardant aids.

4. A method for imparting oil resistance, chemical resistance, dimensional precision, gasoline resistance, hot water resistance, alkali resistance and acid resistance to an automobile part which, during operation of an automobile, comes into direct contact with fuel, oil or combustion gas, said method comprising forming the portion of the automobile part which comes into direct contact with at least one of a fuel, oil, or combustion gas, from an engineering plastic consisting of polybutylene naphthalene-2,6-dicarboxylate homopolymer or, said homopolymer and at least one additive, in an amount that does not impair the physical properties of the polybutylene naphthalene-2,6-dicarboxylate homopolymer, and having an intrinsic viscosity ($\eta$) of 0.6 to 1.2 dl/g as measured in o-chlorophenol at 35° C., and a tensile strength of 600 to 1100 kgf/cm$^2$, and wherein said at least one additive, when present, is selected from the group consisting of fillers, stabilizers, coloring agents, ultraviolet absorbers, mold release agents, anti-static agents, crystallization promoters, nucleating agents, fire retardants and fire retardant aids and allowing said portion to come into direct contact with said fuel, oil or combustion gas.

5. The method of claim 4 wherein said automobile part is an automobile oil filter having a filter portion that comes into direct contact with oil, and allowing said filter portion consisting of polybutylene naphthalene-2,6-dicarboxylate homopolymer or, said homopolymer and said at least one additive, to come into direct contact with oil.

* * * * *

UNITED STATES PATENT AND TRADEMARK OFFICE
CERTIFICATE OF CORRECTION

PATENT NO.   : 5,591,351
DATED        : January 7, 1997
INVENTOR(S)  : HATAYAMA, ET AL.

It is certified that error appears in the above-indentified patent and that said Letters Patent is hereby corrected as shown below:

On the cover page of the Patent in the section titled "Notice":

Please delete:  Pat. No. 5,290,855

Please insert:  Pat. No. 5,290,835

Signed and Sealed this

Fifteenth Day of April, 1997

Attest:

BRUCE LEHMAN

Attesting Officer

Commissioner of Patents and Trademarks